INVENTOR
EMILE MARIE ORTMANS
BY Young + Thompson
ATTYS.

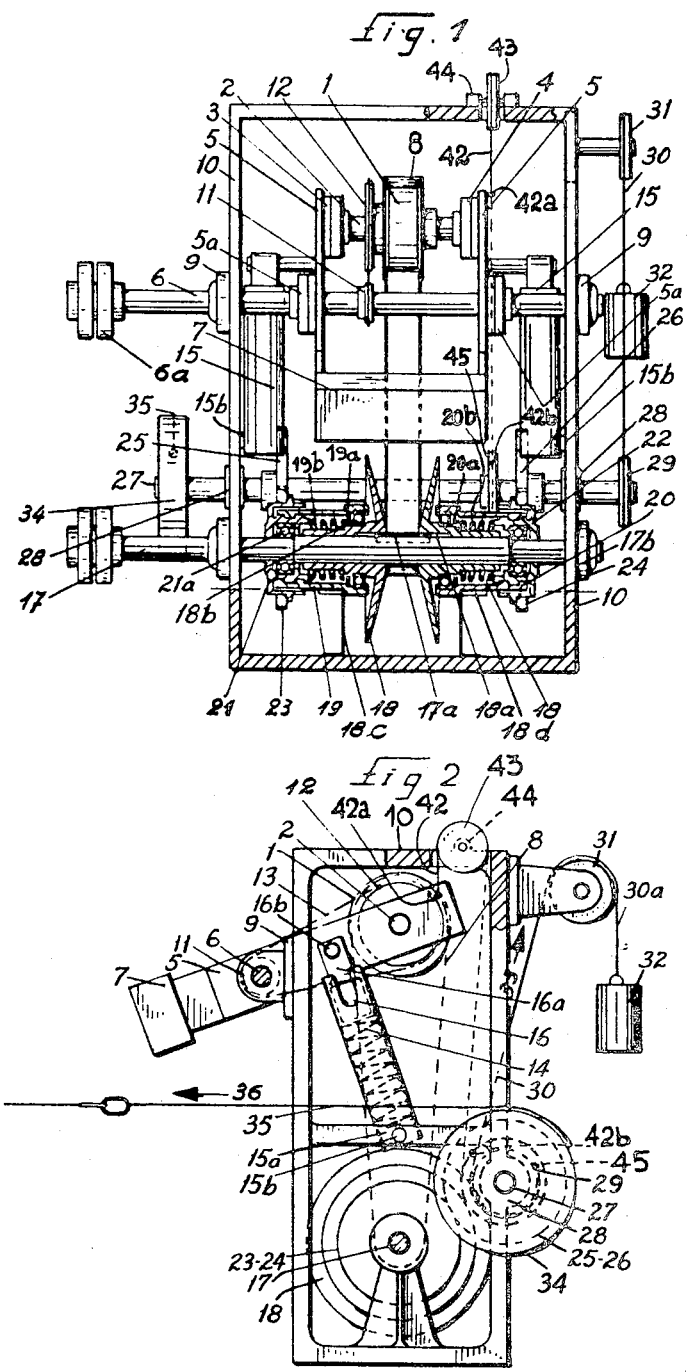

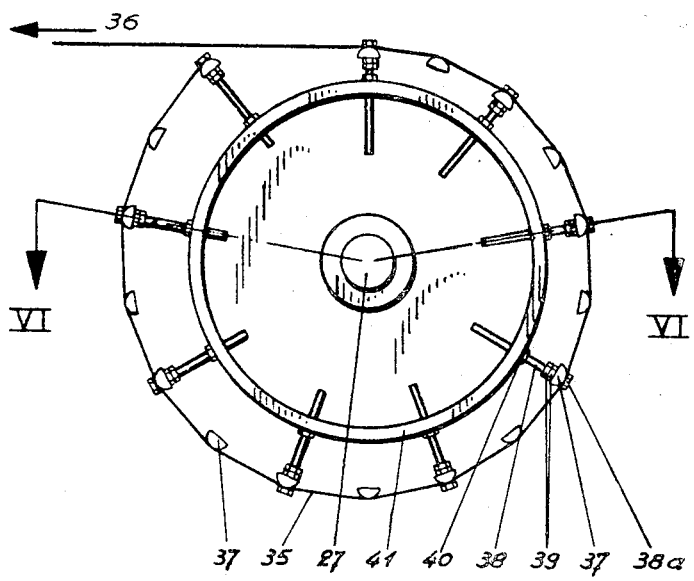
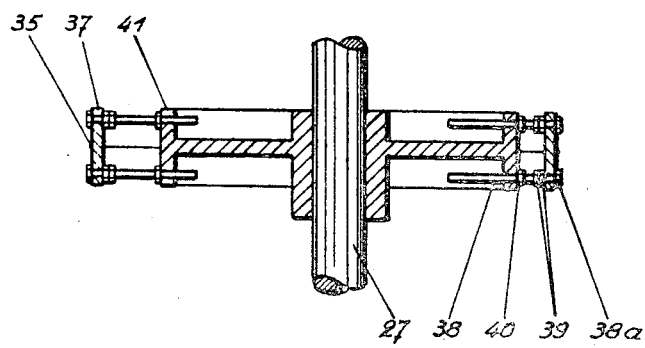

United States Patent Office 3,398,593
Patented Aug. 27, 1968

3,398,593
CHANGE-SPEED GEAR HAVING A TRAPEZOIDAL BELT
Emile Marie Ortmans, 52 Rue de Liege, Verviers, Belgium
Filed May 16, 1966, Ser. No. 550,421
Claims priority, application Belgium, May 25, 1965, 40,526
11 Claims. (Cl. 74—230.17)

ABSTRACT OF THE DISCLOSURE

In a change-speed gear with an endless trapezoidal belt for driving a driven shaft according to a variable velocity of rotation and to a predetermined law there are provided a driving pulley having an inextensible groove mounted on a shaft carried on a rocking member and a driven pulley having an extensible groove on said driven shaft and whose conical plates are slidable by the action of a displacement means on which acts a driving means which comprises an auxiliary shaft carrying a pulley, connected by a cable or a chain to said rocking member whose pivoting is limited by a limiting means according to the pivoting compelled by a control element.

---

In industry, use is made of apparatus known as change-speed gear when it is desired to drive a driven rotating element at a speed of rotation which is different from that of a rotating driving element.

Known are also machines the purpose of which it is to wind a given flexible element, such as a thread or a strip or tape on a cylindrical roll or support. When the said roll has its own driving means and the element to be wound is fed at constant speed, it requires to be wound at this same speed; this cannot be done unless the speed of rotation of the roll remains, during the winding of each layer, inversely proportional to the respective diameter of each layer.

Various mechanisms have already been proposed for modifying the speed of rotation of the roll so as to adapt it to the speed at which the element is to be wound is fed to it; these mechanisms are not always satisfactory and this is, notably, the case in the textile industry with regard to so-called flyer frames, wherein the speed of rotation of the rolls is required to vary with a high degree of precision. Flyer frames comprise, essentially, flyers which supply the yarns at constant speed, whilst rotating at constant speed about small cylindrical rolls the speed of rotation of which diminishes after each winding of the layers of yarns one upon the other to form bobbins of larger or greater size. In these flyer frames, the variation in the speed of the rolls is obtained by a variable-speed gear comprising two extremely wide frusto-conical pulleys on which a flat, endless belt is transversely displaceable at the end of each layer by the action of a ratchet device. In a speed varying arrangement of this kind, the flat belt tends to adopt an inclined position relatively to the axes of the pulleys and to slide on the said pulleys. Furthermore, at the end of each winding operation, when the machine has been halted, it is necessary to restore the belt to the starting position and this requires the drawing together of the two pulleys so as to de-tension the belt, the displacement of the belt which is required to return into the starting position and the spacing-apart of the two pulleys so as to re-tension the belt. In addition to these manipulations, in the case of stretching of the belt, it is necessary to adjust the spacing of the pulleys in such manner as to avoid the slipping of the belt on starting up.

The most serious disadvantage of these change-speed arrangements having two pulleys the diameters of which in the median plane of the belt vary simultaneously by the same value resides in the difficulty, if not impossibility, of obtaining exact rotating velocities of the winding rolls, since the decreasing velocities obtained on the driven pulley having a variable diameter which drives them are a function of a fraction $$\frac{D-x.a}{d+x.a}$$

wherein D is the maximum diameter of the driving pulley, $a$ is a constant which is equal to the amount by which the diameter of the pulleys varies during each displacement of the belt, $x$ is the number of displacements and $d$ is the minimum diameter of the driven pulleys, whereas on the other hand the velocities of rotation of the successive layers wound on a roll the diameter of which is $d'$ are a function of the fraction $$\frac{1}{d'+x.b}$$

wherein $x$ is the number of layers and $b$ the thickness of a layer; furthermore, in view of the fact that in a flyer frame the yarn is supplied by flyers rotating at a constant speed in the same direction as the rolls, it is necessary to add this constant speed to the successive speeds of rotation imparted by the varying means to the bobbins.

In order to eliminate the lack of synchronisation between the constant speed of feeding the yarn and the rotational velocities of the bobbins obtained by the variable-pulley change-speed arrangements, it has already been proposed to utilise frusto-conical pulleys having curved generatrices or to vary the displacements of the belt by the action of a cam. However, these solutions do not eliminate the disadvantages due to the inclination of the belt nor to the slipping thereof, nor the necessity to influence the spacing of the pulleys so as to restore the belt to its starting position or in order to re-tension it.

The present invention, the object of which it is to obviate all the disadvantages mentioned hereinabove, relates to change-speed gear having a trapezoidal belt for driving a rotating element in accordance with a variable speed of rotation and with precision, in accordance with a predetermined law, the arrangement being utilisable notably on flyer frames in the textile industry.

Change-speed gear according to the invention consists essentially of a driving pulley having a nonvariable groove and which is put in motion from a driving shaft through intermediary of a transmission arrangement and which drives a driven pulley having an extensible groove by means of a trapezoidal endless belt influenced in continuous manner by a means maintaining it under tension, whilst automatically correcting its lengthening without modifying the selected winding diameter on the driven pulley having an extensible groove so as to obtain a given velocity and automatically maintaining the tension of the said belt constant whatever its selected winding diameter on the said driven pulley. The driven pulley having an extensible groove, mounted on a driven shaft, consists of two conical plates which may be displaced simultaneously in opposite directions by a driving means controlled by a control element in such manner that the plates are subjected to a displacement imposing on the driven pulley a variation in the winding diameter of the belt corresponding to the predetermined law of variation of the velocity of the said pulley.

In a preferred embodiment, the shaft of the driving pulley is carried on a rocker arm provided with a spring which may be assisted by a counterweight and which pivots relatively to the frame about the same axis as the driving shaft driving the said pulley through the agency of a transmission system. The means for the displacement of the conical plates comprises a fixed sleeve which is mounted on the hub of each plate with interposition of a ball bearing arrangement at one end and which is provided at the other end with an internal screw thread with which cooperates a screw mounted on ball bearings keyed on the driven shaft; the said screw is integral with a rotating pinion subjected to the action of a driving means; an important characteristic of this mode of assembly resides in that the screw threads of the two sleeves and of the corresponding screws are of opposite pitch, in such manner that the said plates draw closer together and move apart simultaneously during the rotation of the screws; furthermore, there are also compression springs bearing on the sleeves and the screws, so as to facilitate the rotation of the latter.

The driving means is an auxiliary shaft urged permanently to rotate by a system of any desired type, such as a counterweight, but the action of which is possible only due to the intervention of a control element consisting of a pulley or a cam.

Furthermore, there is also a means for limiting the displacements of the rocker arm to displacements compelled by the control elements; the said means for limiting the displacements of the rocker arm consists of a flexible connecting element, such as a chain or a cable, attached by one end to the rocker arm, extending over a deflecting wheel and attached at its other end to the rim of a pulley fixed on the auxiliary shaft subjected to the action of the control element.

The present invention will be more readily understood on reading the following description which is given with reference to the accompanying drawings, which show an example of embodiment, purely by way of illustration, and wherein:

FIGURE 1 is an elevational front view, partly in section, of change-speed gear according to the invention, the pulleys and the other moving elements being in the position corresponding to high speed;

FIGURE 2 is an elevational side view, drawn to a smaller scale, of change-speed gear as illustrated in FIGURE 1, with a position of the counterweight of the rocker arm which is slightly higher than that shown in FIGURE 1;

FIGURE 5 is a diagrammatic profile view of a cam for the control element;

FIGURE 6 is a sectional view taken along the line VI—VI of FIGURE 5.

Figure 3:
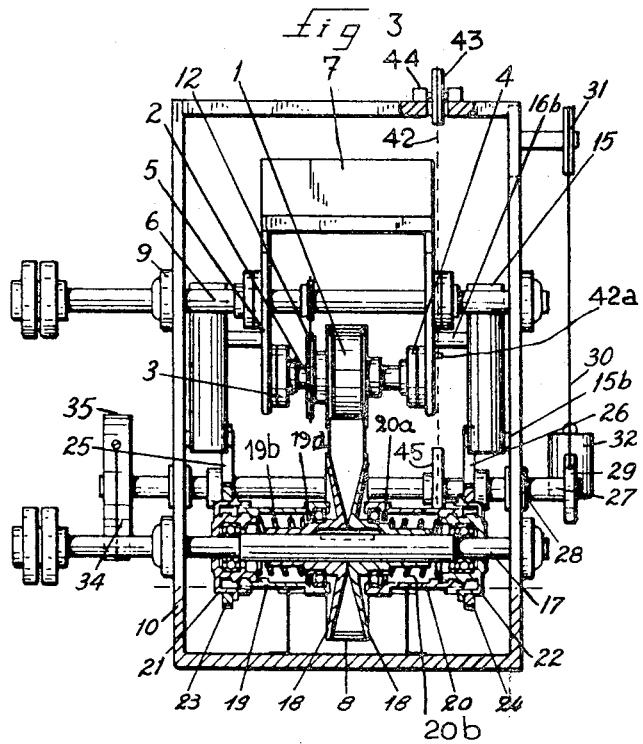
FIGURE 3 is an elevational front view, partly in section of change-speed gear according to the invention, drawn to the same scale as in FIGURE 1, the pulleys and other displaceable elements being in the position corresponding to low speed.

The drawings show only the elements necessary for understanding of the invention.

Fixed on the frame 10 are the support bearings 9 for the shaft 6 which, through the coupling 6a, receives its rotational movement from a motor (not shown). On the said shaft 6, the two arms 5 constituting the rocker member are able to pivot due to journals 5a. Carried at the end of the said arms 5 is the shaft 2; secured on the shaft 6 is the sprocket wheel 11 over which passes the chain 13 transmitting the rotation to the chain wheel 12 secured on the shaft 2 carrying the grooved pulley 1 which thus constitutes the driving pulley of the change-speed gear. At the other end, the arms 5 have a counterweight 7 which balances the weight of the grooved driving pulley 1 and imparts the desired tension to the trapezoidal belt 8. This action of the counterweight 7 may be replaced by the action of the lateral springs 14; the latter are lodged in the tubes 15 and are compressed between the bottom 15a and the piston 16 the rod 16a of which is articulated at 16b to the arms 15 of the rocker member; the bottom 15a of the tubes is articulated at 15b to the frame 10; the springs 14 act on the arms 5 of the rocker member in the same direction as the counterweight 7.

The driven shaft 17 is able to rotate in the bearings 17b which are integral with the frame 10. Formed in the shaft 17 is a groove wherein there is lodged a key 17a which is lodged in corresponding grooves 18a formed in the bore of the hub of the conical plates 18 mounted for sliding on the shaft 17; in this manner, the plates 18 drive the shaft 17, whilst sliding thereon. Tightly secured on the hubs of the plates are ball bearings 18b on which take up their position the ends of the cylindrical sleeves 19 and 20 which do not rotate but which slide on the supports 18c fast with the frame 10 and engaged in the grooves 18d of the said sleeves; formed at the other end of the said sleeves are internal screw threads with which cooperate the respective screws 21 and 22 mounted on the ball bearings 21a keyed on the shaft 17. The threads of the sleeves 19 and 20 are of opposite pitch, and this applies also to the threads of the corresponding screws 21 and 22. The said screws are fast with toothed pinions 23 and 24 with which mesh the pinions 25 and 26 mounted on the auxiliary driving shaft 27 which is carried by the two bearings 28 secured to the frame 10.

Lodged within the sleeves 19 and 20 are the helical springs 19b and 20b; the spring 19b bears against the screw 21 and the ring 19a fast with the sleeve 19; the spring 20b bears on the screw 22 and the ring 20a fast with the sleeve 20. It is the purpose of these springs to facilitate the rotation of the screws 21 and 22, since they balance the axial reactions resulting from the pull of the belt 8 on the conical faces of the plates 18.

Secured at one end of the auxiliary shaft 27 is the pulley 29 wound on the rim of which is a cable 30 extending over the deflecting pulley 31 and having a counterweight 32 attached to its end 30a. Due to its direction of winding on the pulley 29, the said counterweight, the action of which takes place in the direction of the arrow 33, tends to rotate the shaft 27 in the clockwise direction (FIGURE 2).

Secured on the other end of the auxiliary shaft is a pulley 34 on the rim of which a cable 35 is wound in the direction contrary to the direction of winding of the cable 30 on the pulley 29. Due to this arrangement the cable 35, when released in the direction opposite to that of the arrow 36, for example by means of a ratchet system (not shown) controls the rotation of the shaft 27 which is permanently urged into rotation by the counterweight 32. When the auxiliary shaft 27 rotates, it simultaneously rotates the pinions 25 and 26, which drive the pinions 23 and 24 simultaneously acting on the screws 21 and 22 which, in turn, simultaneously act on the sleeves 19 and 20 respectively, which slide axially and displace the plates 18 in opposite directions. In this manner, the plates are drawn together or spaced apart depending on whether the cable 35 is released or drawn back in the direction of the arrow 36.

FIGURES 1 and 2 show the various displaceable members in the position which they occupy when the plates are spaced apart, i.e., when the winding diameter of the belt on the driven pulley is smallest, this corresponding to the highest speed of rotation of the driven shaft 17. In proportion as the cable 35 permits the rotation of the auxiliary shaft 27 of the driving means, the winding diameter of the belt on the driven pulley increase until the plates are in contact, the speed of the shaft 17 diminishes, the rocker member 5 pivots to approach the pulley 1 to the driven pulley and the springs 14 are compressed.

However, jolting may be caused by sudden starting; then, the driving pulley 1 and its rocker member 5 may approach the driven pulley in a sudden manner, despite the action of the counterweight 7 and of the springs 14; the result of this would be to suddenly de-tension the belt 8 which would slide on the driven pulley. This disadvantage is avoided, since the displacements of the rocker member are limited to the displacements compelled by the control element. To this end, a flexible element consisting for example of a cable 42 is attached at one end 42a to the rocker member 5 carrying the driving pulley 1 and then passes over a deflecting wheel 43 the shaft of which rotates freely in a bearing 44 mounted on the frame 10 and, at its other end 42b, it is attached to the rim of a pulley 45 carried on the auxiliary shaft 27.

The counterweight 32 rotates the auxiliary shaft 27 in accordance with the control of the cable 25 which is released in the direction opposite to that of the arrow 36.

The cable 42 is wound on a part at least of the pulley 45 in the same winding direction as the cable 30 on the pulley 29; the diameter of the pulley 45 is selected in such manner that the length of the cable 42 liberated by the rotation of the said pulley corresponds to the length of the cable 42 required by the displacements of the rocker member. By means of the connection thus established between the rocker member 5 and the auxiliary shaft 27, the said rocker member is no longer able to rapidly approach the driven pulley, since it is constantly retained by the cable 42 and it is only able to move gradually, to the extent permitted by the rotation of the pulley 45 of the shaft 27.

Figure 4:
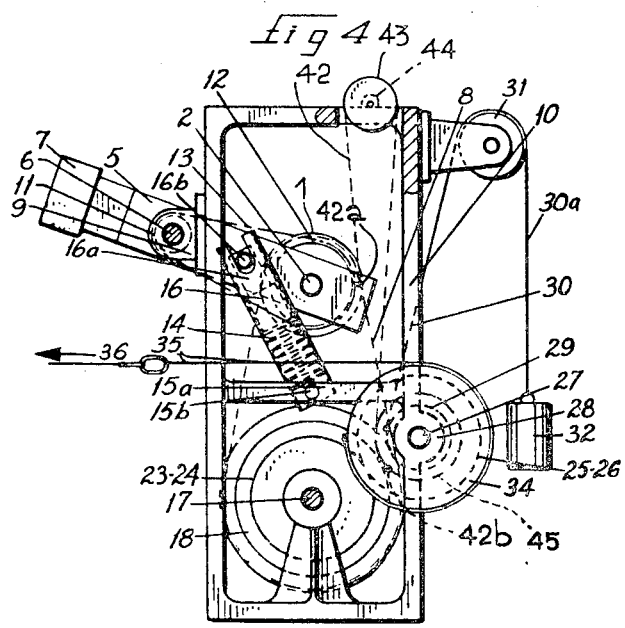
FIGURE 4 is an elevational side view, drawn to a slightly smaller scale, of the change-speed gear, showing a position of the counterweight of the rocker arm which is slightly lower than that shown in FIGURE 3.

In FIGURES 3 and 4, the displaceable members occupy the position corresponding to the lowest speed of the driven shaft 17, obtained when the plates 18 are in contact.

In order to obtain, on the driven shaft 17, a speed variations which is in accordance with a predetermined law, it is possible to replace the pulley 34 by a cam such as the cam shown by way of example in FIGURES 5 and 6.

In this case, projecting elements are disposed in accordance with generatrices on the drum 41 mounted on the auxiliary shaft 27. These elements comprise small columns 38 which are screwed into the drum and which terminate in a head 38a; the said small columns carry cross members 37 which are locked by nuts 29; the height of the said small columns is adjustable by screwing them to a greater or lesser extent into the drum 41 and they are locked by the nuts 40. The cable 35 is then wound on the cross members 37.

The system which has just been described is advantageous, since it permits easy variation of the speed of the driven shaft 17, by imparting to the cable 35 a movement corresponding to the desired speed variation law.

The returning into the starting position corresponding to the higher speed of the shaft 17 is particularly simple; with the change-speed gear halted, a pull is exerted on the cable 35 in the direction of the arrow 36, thus drawing up the counterweight 32, the conical plates 18 being spaced apart by the rotation of the shaft 27, under the action of the counterweight 7 or of the springs 14, the driving pulley 1 is automatically spaced away from the driven pulley and the belt 8 is maintained perfectly tensioned; the elongation thereof is thus automatically corrected at any instant by the rocker member under the action of the counterweight or springs.

What I claim is:

1. Change-speed gear comprising a support frame, a driving shaft, a driving pulley having a nonextensible groove, a driven shaft, a driven pulley having an extensible groove on said driven shaft, an endless trapezoidal belt passing over said driving pulley and said driven pulley, a flexible transmission between said driving shaft and said driving pulley, a rocker member carrying said driving pulley and pivotally mounted on said support frame, a pivoting means continuously acting on said rocker member for tending the latter to pivot in the direction opposite to the pulling direction of said belt which is automatically tensioned, whilst retaining the winding diameter selected on said driven pulley in accordance with the desired speed for driving said driven shaft according to a predetermined law, said driven pulley being composed of two conical plates slidable on said driven shaft, a displacement means for causing said conical plates to slide simultaneously, a driving means acting on said displacement means, a control element acting on said driving means for imparting to said plates a sliding movement such that the variation of the winding diameter of said belt on said driven pulley imparts to said driven pulley a velocity of rotation corresponding to said predetermined law, a limiting means for limiting the pivoting of said rocker member according the pivoting compelled by said control element, said displacement means comprising for each of said two conical plates a sliding sleeve having one end mounted on the hub of each said two conical plates through ball bearings, whereas the opposite end is provided with a screw thread with which cooperates a screw mounted on ball bearings keyed on said driven shaft and integral with a pinion driven by said driving means.

2. Change-speed gear according to claim 1, characterised in that said two sleeves mounted on the hubs of said two conical plates and said screws are of opposite pitch, in such manner that said plates are drawn together or are spaced apart simultaneously due to the rotation of said screws in the same direction.

3. Change-speed gear according to claim 1, characterised in that said driving means for said screws comprises an auxiliary shaft the rotation of which produced by the action of a counterweight obeys said control element in accordance with the law to which the speed of rotation of said driven shaft is to be subjected.

4. Change-speed gear according to claim 3, characterised in that said auxiliary shaft is provided with toothed pinions driving said screws cooperating with said sliding sleeves and a pulley on which is wound a cable carrying said counterweight and the action of which is controlled by said control element also consisting of a pulley and a cable wound in the direction opposite to that of the cable having said counterweight and freed in accordance with the predetermined speed-change law.

5. Change-speed gear according to claim 1, characterised in that there is provided for each of said two conical plates a compression spring bearing on said sleeve probably with a ring, and on said screw, so as to neutralise the axial thrust forces resulting from the pull of said belt on the conical face of said two conical plates.

6. Change-speed gear according to claim 1, characterised in that said control element comprises a cam the profile of which is selected in accordance with the predetermined velocity variation law.

7. Change-speed gear according to claim 6, characterised in that said cam has an adjustable profile.

8. Change-speed gear according to claim 7, characterised in that said cam comprises a drum provided with small columns the height of which is adjustable and which carry cross members on which said cable is wound.

9. Change-speed gear according to claim 3, characterised in that said flexible element for connecting said rocker member to said control element is attached at one end to said rocker member, passes over an intermediate deflecting wheel, and is attached at its other end to the rim of a pulley carried by said auxiliary shaft subjected to the action of said control element.

10. Change-speed gear according to claim 9, characterised in that said flexible element connecting said rocker member to said control element consists of a cable or a chain.

11. Change-speed gear comprising a support frame, a driving shaft, a driving pulley having a nonextensible groove, a driven shaft, a driven pulley having an extensible groove on said driven shaft, an endless trapezoidal belt passing over said driving pulley and said driven pulley, a flexible transmission between said driving shaft and said driving pulley, a rocker member carrying said driving pulley and pivotally mounted on said support frame, a pivoting means continuously acting on said rocker member for tending the latter to pivot in the direction opposite to the pulling direction of said belt which is automatically tensioned, whilst retaining the winding diameter selected on said driven pulley in accordance with the desired speed for driving said driven shaft according to a predetermined law, said driven pulley being composed of two conical plates slidable on said driven shaft, a displacement means for causing said conical plates to slide simultaneously, a driving means acting on said displacement means, a control element acting on said driving means for imparting to said plates a sliding movement such that the variation of the winding diameter of said belt on said driven pulley imparts to said driven pulley a velocity of rotation corresponding to said predetermined law, a limiting means for limiting the pivoting of said rocker member according the pivoting compelled by said control element, said displacement means comprising for each of said two conical plates a sliding sleeve having one end mounted on the hub of each said two conical plates through ball bearings, whereas the opposite end is provided with a screw thread with which cooperates a screw mounted on ball bearings keyed on said driven shaft and integral with a pinion driven by said driving means, said driving means being formed of an auxiliary shaft rotated by a counterweight and obeying said control element, a connection between said driving shaft and a shaft controlling the feed cylinders of a flyer frame, a bobbin-carrying carriage on said flyer frame, said driven shaft driving said bobbin through a control differential of said bobbins, a mechanism controlling the displacement of said bobbin-carrying carriage and said control element of said auxiliary shaft being subjected to said mechanism each time that said carriage reaches its travel end.

References Cited

UNITED STATES PATENTS

| 2,175,551 | 10/1939 | Perry | 74—230.17 |
| 2,986,353 | 5/1961 | McCoy | 242—45 |

C. J. HUSAR, *Primary Examiner.*